Patented June 17, 1947

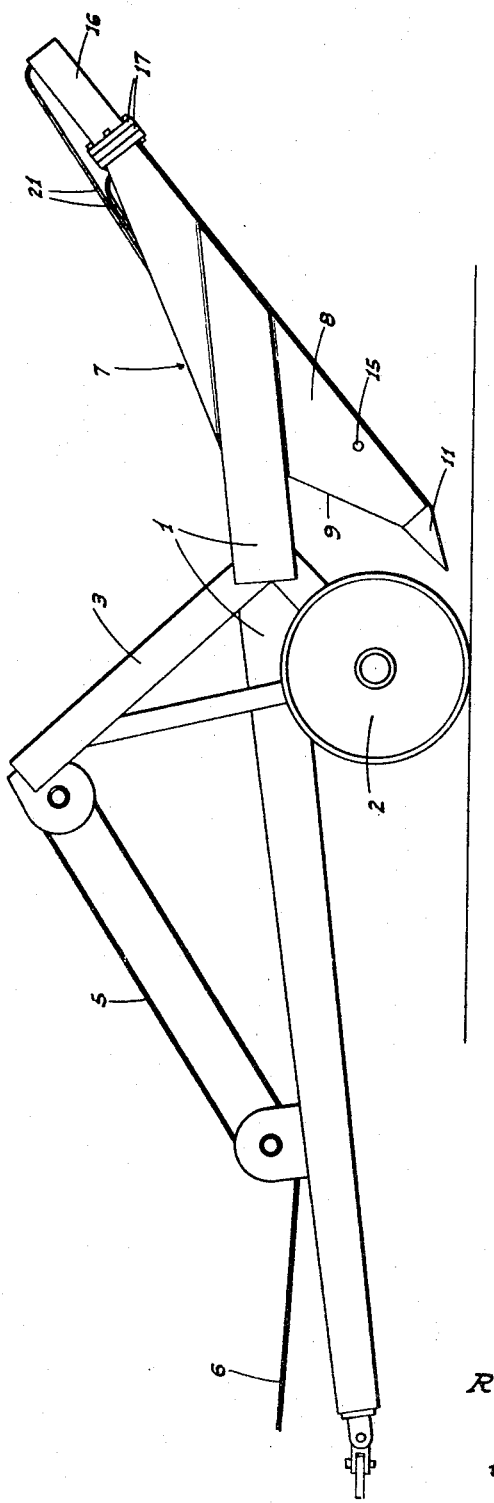

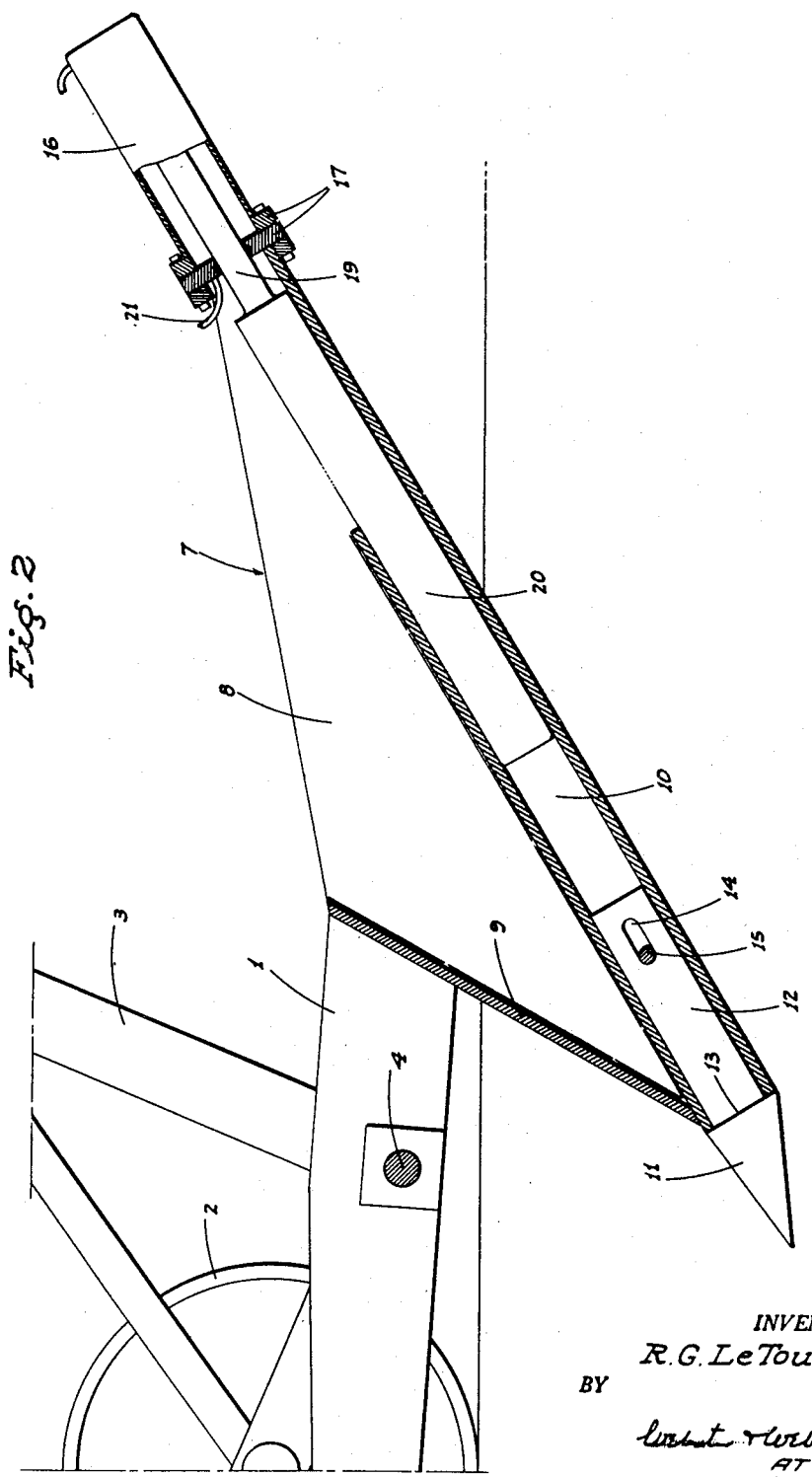

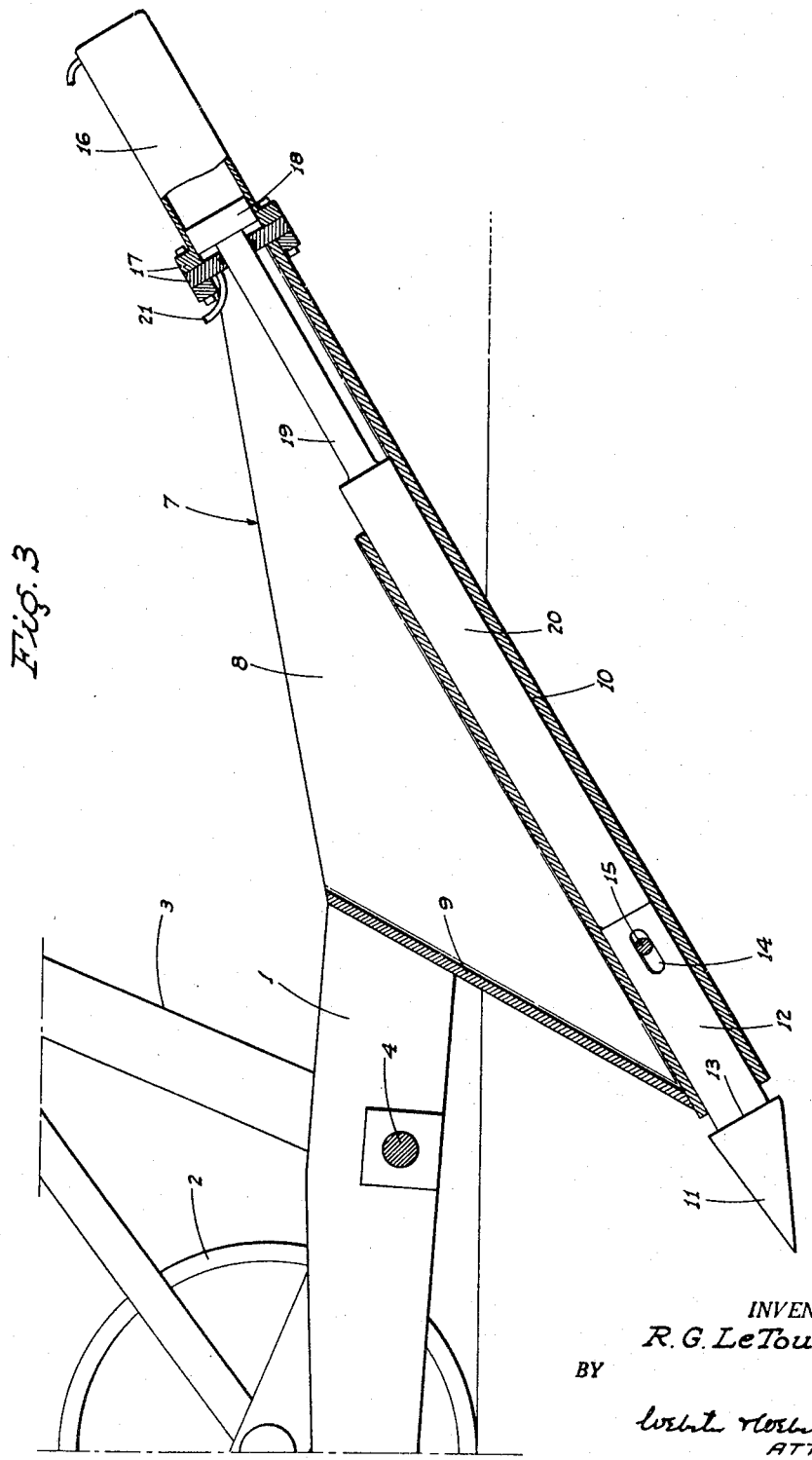

2,422,490

UNITED STATES PATENT OFFICE 2,422,490

ROOTER

Robert G. Le Tourneau, Peoria, Ill., assignor to
R. G. Le Tourneau, Inc.

Application August 20, 1945, Serial No. 611,576

3 Claims. (Cl. 262—8)

This invention relates in general to an improved earth working implement of the type known as a "rooter"; such an implement conventionally including a forwardly and downwardly inclined tooth unit rigidly supported from a draft frame adapted to be tractor drawn. Heretofore the entire impact of the tooth unit against any obstacle, such as a section of extremely hard packed earth, or a rock, was imparted to said tooth unit solely by the traction of the tractor. This was a limiting factor in the use of the implement.

It is therefore an object of this invention to provide a rooter which includes a novel tooth unit associated with power means operative to forcefully actuate the tooth forwardly in a material breaking direction independently of, or in supplement to, the force in such direction derived from the traction of the tractor.

A further object of the invention is to provide a rooter which includes a tooth unit having a heavy-duty tooth movable forwardly in guided relation from normal abutment against a rigid backing member, and a power cylinder arranged to reciprocate a plunger mounted to deliver powerful hammer-like blows to the tooth at the rear end whereby to advance the tooth beyond the abutment member and to shatter any breakable obstacle against which the tooth may be engaged.

A further object is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement, showing the wheels lowered and the tooth unit elevated above ground, as for transport.

Figure 2 is an enlarged fragmentary sectional elevation showing the tooth unit in ground engagement, but with the power actuated plunger retracted.

Figure 3 is a view similar to Figure 2, but shows the power actuated plunger advanced into hammer-like engagement with the shank of the tooth.

Referring now more particularly to the characters of reference in the drawings, the implement comprises a longitudinal, heavy-duty main frame 1 provided at its forward end with a hitch adapted for connection with the drawbar of a tractor. Adjacent but short of the rear end of the main frame 1 the implement includes a pair of transversely spaced wheels 2, and said wheels are mounted for relative vertical adjustment by means of a swing frame 3 pivoted to the main frame on a cross axle 4; said swing frame being of substantially conventional form and actuated by a cable system, indicated generally at 5. The cable system 5 includes a pull lead 6 adapted to extend forwardly to a power winch on the tractor, whereby operation of such pull lead in one direction or the other correspondingly moves the swing frame 3 with resultant up or down movement of the wheels 2 relative to the frame.

Rearwardly of the wheels 2 and swing frame 3 the implement is provided with an earth working mechanism which comprises the following:

A rigid, forwardly and downwardly inclined body, indicated generally at 7, of relatively narrow configuration, is fixed on the rear end of the main frame 1 and includes, in adjacent but spaced-apart relation, a pair of side walls 8, a front plate 9, and a bottom formed by an elongated tubular guideway 10 between said side walls. This tubular guideway 10 opens at its lower end in a forward and downward direction.

The ground engaging or rooter tooth is indicated at 11 and includes a rearwardly projecting shank 12 of reduced diameter which slidably engages, in matching relation, in the lower end portion of the tubular guideway 10. The inner end of the tooth 11, outwardly of the shank 12, forms a shoulder 13 which normally abuts against the lower end of the guideway 10. The shank 12 is formed with a longitudinal slot 14, through which a cross pin 15 on the guideway engages; this slot and pin arrangement limiting advancing movement of the tooth 11 from a position with the shoulder 13 in engagement with the forward end of the guideway 10, as shown in Fig. 2, to a predetermined advanced position, as shown in Fig. 3.

At its upper and rear end the body 7 is fitted with an outwardly projecting, double-acting power cylinder 16 of fluid pressure type; said power cylinder being mounted on the body in axial alinement with the tubular guideway 10 by means of matching flanges 17. The power cylinder 16 includes a piston 18 and a downwardly and forwardly projecting piston rod 19 attached at its lower and forward end to a heavy-duty plunger 20 slidably disposed in the tubular guideway 10.

The plunger 20 is of such length that when retracted, as in Fig. 2, its lower end is clear of the upper end of the shank 12. However, the stroke of the piston 18 is such that when the piston advances to its limit of travel, as shown in Fig. 3, the plunger 20 is forcefully engaged with a hammer-like blow against the adjacent end of the shank 12, instantaneously imparting a forward thrust to said shank and the tooth 11 from the position of Fig. 2 to the position of Fig. 3.

The double acting power cylinder 16 includes fluid pressure conduits 21 leading to opposite ends thereof, and such conduits are adapted to be connected, through the medium of a two-way valve (not shown), with a fluid pressure source on the tractor. Such valve may be of hand type so as to provide for manual control of reciprocation of the piston 18, or the valve may be automatically controlled from the piston to provide for multiple high speed reciprocation of the piston to accomplish a rapidly recurring hammering action on the shank 12.

When the implement is in use, and the tooth 11 comes into engagement with an obstacle such as a rock unbreakable by the force imparted from the traction of the tractor, the operator proceeds as follows:

The tractor is driven forwardly until the tooth 11 is firmly in contact with such obstacle, and at which time the tooth is in the retracted position of Fig. 2. Thereafter, the double acting power cylinder 16 is actuated, resulting in the plunger 20 producing a hammering action on the shank 12, driving the same forwardly to shatter the obstacle against which said tooth is engaged. Thus, the tractive force of the tractor is supplemented by powerful means, and as a result obstacles heretofore unbreakable can now be readily disintegrated by the implement.

Replacement of the tooth 11 can be accomplished readily and quickly by merely withdrawing the cross pin 15, permitting the shank 12 to be slid out of the lower end portion of the tubular guideway 10.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A rooter comprising a longitudinal rigid main frame, a hitch at one end of the frame for connecting such frame to a draft means, a cross axle on the main frame, a swing frame pivoted on said cross axle, wheels journaled on the swing frame and operable to engage the ground and lift the main frame when the swing frame is moved in one direction and to move away from the ground and lower the main frame when the wing frame is moved in the opposite direction, a rooter unit fixed at the rear end of the main frame and rigid therewith, such rooter unit being in the form of a generally tapering body projecting downwardly and forwardly from the main frame and terminating at its forward end in a digging point, such point being separate from the body but connected thereto for relative reciprocating movement with respect thereto, and power means mounted in connection with such rooter unit and operable to impart such movement to the point, the rooter unit including said body and point being operable to be submerged below the ground level upon the main frame being pulled forward with a concurrent lifting of the wheels.

2. A structure as in claim 1 in which the tapering body is made up of relatively thin side and top plates, the bottom of said body being in the form of a tubular member interposed between the side plates and opening adjacent the apex of the body, the point being a relatively hard solid element, a shank on the point projecting into the lower end of the tubular member with a sliding fit whereby to provide for said reciprocating movement of the point.

3. A rooter comprising a longitudinal rigid main frame, a rooter unit rigidly secured to the main frame, such unit including a relatively narrow body projecting downwardly and forwardly relative to the main frame, a digging point disposed at the lower end of the body, such point projecting forwardly of the plane of the front edge of the body, said point being separate from the body but connected thereto for relative reciprocatory movement with respect thereto, power means mounted in connection with said unit and operable to impart such movement to the point, and means to pull the main frame forwardly and to simultaneously lower the same whereby to submerge the rooter unit below the ground surface.

ROBERT G. LE TOURNEAU.

REFERENCES CITED

The following references are of record in the file of this patent:

UNITED STATES PATENTS

| Number | Name | Date |
|---|---|---|
| 494,909 | Wallis | Apr. 4, 1893 |
| 1,644,110 | Cover et al. | Oct. 4, 1927 |
| 1,731,984 | Reaney | Oct. 15, 1929 |
| 1,840,002 | Wallis | Jan. 5, 1932 |
| 2,228,445 | DeVelbiss | Jan. 14, 1941 |
| 2,270,840 | Allen | Jan. 27, 1942 |
| 2,302,614 | Le Tourneau | Nov. 17, 1942 |
| 2,320,365 | La Rue | June 1, 1943 |